Patented Sept. 8, 1953

2,651,639

UNITED STATES PATENT OFFICE 2,651,639

2-PYRROLIDONE-5-CARBOXAMIDE DERIVATIVES AND METHODS OF PREPARING THE SAME

Robert Bruce Angier, Pearl River, N. Y., assignor to American Cyanamid Company, New York, N. Y., a corporation of Maine No Drawing. Application August 22, 1951, Serial No. 243,155

14 Claims. (Cl. 260—326.3)

This invention relates to certain new $N^5$-aralkyl-2-pyrrolidone-5-carboxamides and methods of preparing the same. The new compounds of this invention may be represented by the following general formula:

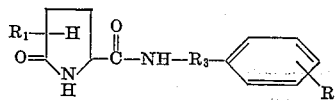

in which $R_1$ represents hydrogen or at least one lower alkyl substituent connected to carbon in the pyrrolidone nucleus, $R_2$ represents hydrogen or at least one substituent selected from the group consisting of halogen and lower alkyl, and in which $R_3$ represents a methylene (—$CH_2$—) group. A substituent or substituents represented by $R_1$ may be in any or all of the 3, 4 and 5 positions of the pyrrolidone nucleus, and a substituent or substituents represented by $R_2$ may be in any of the ortho, meta, or para positions of the benzene ring.

The new compounds of this invention have been found to have anticonvulsant activity in rats. This is indeed unexpected in view of the fact that extremely closely related compounds have been found to be entirely lacking in such activity. For instance in the above formula $R_3$ must represent a methylene group since compounds in which $R_3$ represents other groups such as ethylene or substituted methylene have failed to show the desired activity. Likewise, if the methylene group is missing so that one has a phenyl substituted amide, the compounds fail to show the desired activity. Loss of activity can also be produced by substituting the 1-nitrogen in the pyrrolidone nucleus. In other words, only a very narrow class of $N^5$-aralkyl-2-pyrrolidone-5-carboxamides have shown the property of having anticonvulsant activity. Lower alkyl substituents on the 3, 4 or 5 position of the pyrrolidone nucleus do not appear to materially affect the activity of the compounds to any appreciable extent although the effective dosage is sometimes lower in compounds having such substituents. Likewise, substituents upon the phenyl nucleus of the types listed above as a general rule do not materially affect the activity although some compounds in which the phenyl nucleus is substituted appear to be less active and require a higher dosage than compounds in which the phenyl group is unsubstituted. Lower alkyl radicals with which the pyrrolidone and phenyl nucleus may suitably be substituted may be illustrated by methyl, ethyl, and propyl radicals, and halogen radicals with which the phenyl nucleus may be substituted may be illustrated by chlorine and bromine.

To determine the anticonvulsant activity of the new compounds of this invention, tests were made upon rats which had been treated with one of the compounds to determine their resistance to artificially induced convulsions. The resistance of rats, which had been treated with a given compound, to sound which ordinarily causes them to convulse was first determined and if the pyrrolidone compound showed unusual promise in this test, the resistance of the rats to electroshock was then tested. In the audiogenic test, a rat was treated with a given pyrrolidone compound and after allowing a reasonable period for absorption the rat was subjected to the noise created by a blast of air upon a series of baffles for from 16 seconds to 60 seconds. Only rats which had shown a susceptibility to convulsions under these conditions by at least 3 previous convulsions on 3 preceding days were employed in the test. In other words, before a pyrrolidone compound was rated as active it must have prevented or limited the intensity of a convulsion in a rat, which rat had previously been shown to be subject to convulsions under the conditions employed. In the electroshock treatment, the activity of a compound was determined by its ability to prevent or lessen the severity of a convulsion under conditions which had been previously shown on 3 preceding days to cause convulsions in the individual rats tested. Such procedures for testing a compound for anticonvulsant activity are well known and widely accepted by those skilled in the art and since they do not constitute an essential part of the present invention will not be described in greater detail.

The following table lists the activities of various pyrrolidone compounds in controlling convulsions in rats ordinarily produced by sound (audiogenic) and also, in some instances, the compounds' activity in controlling convulsions ordinarily produced by electroshock. All of the compounds tested may be represented by the following formula:

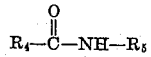

in which $R_4$ and $R_5$ represent radicals as indicated in the table. A rating of 4 plus is given to compounds which completely prevented convulsions or which prevented convulsion except during actual excitement: a rating of 3 plus is given to compounds which prevented convulsions except during actual excitement or only momentarily after excitement was terminated: a rating of 2 plus or 1 plus was given to compounds which caused the rats to have convulsions to a less degree or for a shorter period of time after excitement was terminated. The dosages given in the table are in milligrams of compound per kilograms of body weight. If the compound was given orally it is so indicated and if given by injection it is indicated by "ip" after the dosage in milligrams.

since compounds which should be more readily absorbed in the animal body do not show the same desired degree of anticonvulsant activity.

Of course, the new compounds of this invention have other utility and may be employed in many varied fields of chemistry. For instance the new compounds may be employed as plasticizers for cationic melamine resins.

It is one of the advantages of the present invention that the new compounds thereof may be

*Table I*

| Structure | | Activity Rating | | | |
|---|---|---|---|---|---|
| | | Audiogenic | | Electroshock | |
| $R_4$ | $R_5$ | Rating | Dose | Rating | Dose |
| (H₃C)₂ pyrrolidone with CH₃ | $-CH_2-C_6H_5$ | +++ | mg/kg 250ip | +++ ++ | mg/kg 250ip 250ip 500oral |
| pyrrolidone (unsubstituted) | $-H$ | 0 | 3000oral | | |
| | $-CH_2-C_6H_5$ | ++++ +++ | 1000ip 4000oral | ++ | 1000ip |
| | $-CH_2CONH_2$ | 0 | 1000oral | | |
| | $-CH_2-CH=CH_2$ | 0 | 600oral | | |
| | $-CH(CH_3)_2$ | 0 | 3000oral | | |
| | $-CH_2CH_2OH$ | 0 | 3000oral | | |
| | $-CH_2CH_2-C_6H_5$ | 0 | 1000oral | | |
| | $-C_6H_5$ (H) | 0 | 2000oral | | |
| | $-CH_2-C_6H_4-Cl$ | + | 500ip | | |
| | $-C_6H_5$ | 0 | 75ip | | |
| | $-CH(CH_3)-C_6H_5$ | 0 | 250ip | | |
| | $-CH_2-C_6H_4-CH_3$ | +++ | 350ip | + | 350ip |
| | $-CH_2CH_2N(C_2H_5)_2$ | 0 | 500oral | | |
| | $-CH_2-C_6H_3(CH_3)_2$ | + | 1000oral | | |

In the above table it will be seen that of the 2-pyrrolidone-5-carboxamides tested only the narrow class constituting the subject matter of this invention display the valuable property of having anticonvulsant activity.

The reason for the extraordinary effect of the benzyl or substituted benzyl group is not fully understood, nor has it been determined why other groups quite similar to the benzyl or substituted benzyl group do not give compounds having anticonvulsant activity. It is, therefore, not intended that the present invention be limited to any theory with regard to the activity of the new compounds. It seems reasonably certain, however, that it is not simply a question of absorption prepared by any of several methods. For instance, the new compounds may be prepared by heating a benzyl amine or the appropriately substituted derivative thereof with an ester of the appropriate 2-pyrrolidone-carboxylic acid. This method may be employed for preparing any of the new compounds of this invention and is the preferred method for preparing compounds in which the pyrrolidone nucleus is highly substituted. For instance, this method is the preferred method for preparing 3,3,5-trimethyl-N⁵-benzyl-2-pyrrolidone-5-carboxamide.

A second method has also been discovered for preparing the compounds of the class represented by the above general formula. This method is preferred for preparing compounds in which the pyrrolidone nucleus is unsubstituted and it is intended that this new method also constitute a part of the present invention. This new method comprises reacting a benzyl amine or the appropriately substituted derivative thereof with diesters of glutamic acid or the appropriately substituted derivatives thereof. The new reaction may be illustrated by the following equation:

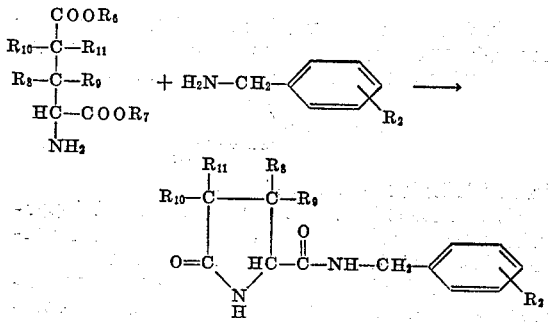

in which $R_6$ and $R_7$ represent esterifying radicals; $R_8$, $R_9$, $R_{10}$ and $R_{11}$ represent the same or different members selected from the group consisting of hydrogen and lower alkyl radicals; and $R_2$ is as defined above.

The reaction may be performed in an inert solvent or if desired it may be performed in the absence of a solvent. The preferred procedure comprises employing an excess of the aralkyl amine reactant as a solvent. Other materials which may suitably be employed as solvents may be illustrated by acetone, ethyl alcohol, dioxane and chloroform. The reaction may be performed over a wide range of temperatures, for instance from room temperature up to the reflux temperature of the benzyl amine or the solvent employed. In fact, if desired, the reaction may be performed at temperatures below room temperature, for instance 10° C. At room temperature, about 2 to 6 hours should be allowed for reaction and at higher temperatures, for instance 100° C., from 30 minutes to 2 hours should be allowed. Of course, longer reaction periods may be employed if desired as there is little or no danger of decomposing the product.

The invention will be more particularly illustrated by the following examples in which all parts are by weight unless otherwise indicated.

Example I

With 110 g. of p-chlorobenzylamine there is mixed 80 ml. of diethyl glutamate and this mixture allowed to stand at room temperature for 2 days. At the end of this time the mixture is diluted with several volumes of ether, cooled, and the product removed by filtration. This $N^5$-(p-chlorobenzyl)-2-pyrrolidone-5-carboxamide is then purified by 2 recrystallizations from absolute alcohol.

Example II

About 170 g. of p-methylbenzylamine is mixed with 110 ml. of diethyl glutamate and this mixture is allowed to stand at room temperature for 2 days. The reaction mixture is then diluted with 900 ml. of ether and cooled overnight. The resulting crystals of $N^5$-(p-methylbenzyl)-2-pyrrolidone-5-carboxamide are collected and purified by 2 recrystallizations from ethyl acetate.

Example III

With 7 ml. of diethyl glutamate there is mixed 11 g. of o,p-dimethylbenzylamine and this mixture is allowed to stand for 2 days at room temperature. The reaction mixture is diluted with 6 volumes of ether and cooled. The resulting crystals of $N^5$-(2,4-dimethylbenzyl)-2-pyrrolidone-5-carboxamide are collected and purified by 3 recrystallizations from ethanol-ether solution.

Example IV

With 900 ml. of benzylamine there is mixed 550 g. of diethyl glutamate and the resulting mixture heated at about 90° C. on a steam bath for 3 hours. The reaction mixture is then cooled to room temperature and 4 liters of ether added. The mixture is cooled overnight and the crystalline product collected. This $N^5$-benzyl-2-pyrrolidone-5-carboxamide is purified by recrystallization from ethanol.

Example V

A mixture of 5.5 g. of diethyl glutamate and 10 ml. of benzylamine is heated almost to reflux for about 15 minutes. After standing an additional 15 minutes the mixture is cooled and diluted with 50 ml. of ether. After further cooling the crystalline $N^5$-benzyl-2-pyrrolidone-5-carboxamide is separated and purified by recrystallization from ethanol.

Example VI

A mixture of 5.5 g. of diethyl glutamate and 4 ml. of benzylamine is heated on a steam bath for 2 hours. There is then added 2 ml. of ethanol and 20 ml. of ether and the resulting mixture cooled overnight. The crystalline $N^5$-benzyl-2-pyrrolidone-5-carboxamide is separated and purified by recrystallization from ethanol.

Example VII

To 160 ml. of absolute ethanol plus 40 ml. of ethyl alcohol saturated with HCl gas, there is added 40 g. of 3,3,5-trimethyl-2-pyrrolidone-5-carboxylic acid and this mixture is then refluxed about 2½ hours. The reaction mixture is then concentrated to dryness in vacuo and the resulting residue crystallized from 200 ml. of heptane. The resulting crystals are added to 40 ml. of benzylamine and this mixture heated at 160–170° C. for 8 hours. After cooling, the mixture is diluted with 500 ml. of ether and chilled overnight. The crystalline 3,3,5-trimethyl-$N^5$-benzyl-2-pyrrolidone-5-carboxamide is collected and recrystallized from 5000 ml. of water plus 100 ml. of ethanol.

I claim:

1. The new chemical compounds represented by the formula:

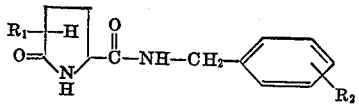

in which $R_1$ represents at least 1 member selected from the group consisting of hydrogen and lower alkyl radicals and in which $R_2$ represents at least 1 member selected from the group consisting of hydrogen, lower alkyl radicals and halogen radicals.

2. The new compound $N^5$-(2,4-dimethylbenzyl)-2-pyrrolidone-5-carboxamide.

3. The new compounds represented by the formula.

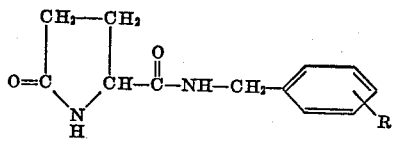

in which R represents a lower alkyl radical.

4. The new compound $N^5$-(p-methylbenzyl)-2-pyrrolidone-5-carboxamide.

5. The new compounds represented by the formula:

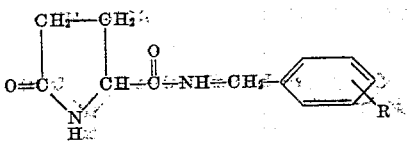

in which R represents a halogen substituent.

6. The new compound $N^5$-(p-chlorobenzyl)-2-pyrrolidone-5-carboxamide.

7. The new compounds represented by the formula:

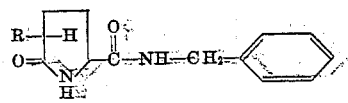

in which R represents at least 1 lower alkyl radical.

8. The new compound 3,3,5-trimethyl-$N^5$-benzyl-2-pyrrolidone-5-carboxamide.

9. The new compound $N^5$-benzyl-2-pyrrolidone-5-carboxamide.

10. A new method of preparing compounds of the formula:

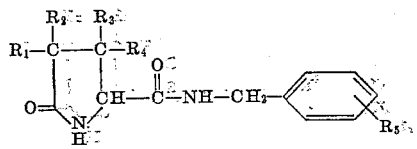

in which $R_1$, $R_2$, $R_3$ and $R_4$ represent members selected from the group consisting of hydrogen and lower alkyl radicals and $R_5$ represents at least 1 member selected from the group consisting of hydrogen, lower alkyl radicals and halogen radicals, which comprises reacting a compound of the formula:

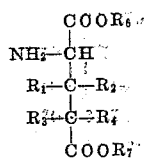

in which $R_6$ and $R_7$ are hydrocarbon esterifying radicals and $R_1$, $R_2$, $R_3$ and $R_4$ are as defined above, with a compound of the formula:

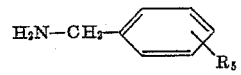

in which $R_5$ is as defined above.

11. A method of preparing $N^5$-benzyl-2-pyrrolidone-5-carboxamide which comprises reacting diethyl glutamate with benzylamine.

12. A method of preparing $N^5$-(p-chlorobenzyl)-2-pyrrolidone-5-carboxamide which comprises reacting diethyl glutamate with p-chlorobenzylamine.

13. A method of preparing $N^5$-(p-methylbenzyl)-2-pyrrolidone-5-carboxamide which comprises reacting diethyl glutamate with p-methylbenzylamine.

14. A method of preparing $N^5$-(2,4-dimethylbenzyl)-2-pyrrolidone-5-carboxamide which comprises reacting o,p-dimethylbenzylamine with diethyl glutamate.

ROBERT BRUCE ANGIER.

References Cited in the file of this patent

Gray, Jr., Chem. Soc. (London), 1928, pp. 1264–1267.